United States Patent [19]
Lowe

[11] 3,774,963
[45] Nov. 27, 1973

[54] SUSPENSION SEATS FOR VEHICLES
[75] Inventor: Charles Bertie Lowe, Parklands, England
[73] Assignee: Universal Oil Company, Des Plaines, Ill.
[22] Filed: July 31, 1972
[21] Appl. No.: 276,622

[30] Foreign Application Priority Data
Aug. 7, 1971  Great Britain.................. 37,192/71

[52] U.S. Cl................. 297/338, 248/399, 248/373, 297/307, 297/410
[51] Int. Cl............................ B60n 1/02, A47c 3/22
[58] Field of Search.................. 297/304, 307, 338, 297/339, 410, 297; 248/373, 378, 399, 402, 307

[56] References Cited
UNITED STATES PATENTS
3,109,621  11/1963  Simon et al......................... 248/399
3,301,520  1/1967  Barth et al......................... 248/399
3,552,706  1/1971  Shingler............................. 248/373
3,599,232  8/1971  Tabor................................ 248/399
3,669,399  6/1972  Wager................................ 248/373

*Primary Examiner*—Casmir A. Nunberg
*Attorney*—James R. Hoatson, Jr. et al.

[57]  ABSTRACT

Suspension seat assembly has a torsion bar spring fixed at one of its ends to one end of a pivoted link forming part of a scissors linkage. The other end of the torsion bar is adjustably fixed to the movable seat part. Screw type weight and height adjustment mechanisms are separably operable by an occupant but work together to rotate the adjustable end of the torsion bar. The mechanism automatically adjusts the Up and Down stop positions of the suspension as the height adjustment is made so that the occupant's weight will center the seat in its ride zone of vertical movement regardless of the height to which the seat is adjusted. Mechanisms for tilting the seat back and adjusting the head rest are also disclosed.

11 Claims, 8 Drawing Figures

SUSPENSION SEATS FOR VEHICLES

This invention relates to seats for vehicles.

According to the present invention there is provided a vehicle seat comprising a seat part supported and guided by a suspension for upward and downward movement relative to a base part, the suspension comprising a system of pivotal suspension arms interconnecting the seat part and base part, a torsion spring connected to one of said arms and applying torque thereto in a sense to oppose its downward pivotal movement, a weight-adjustment mechanism acting on the torsion spring and operable to vary the preload in the spring to match the weight of the seat occupant, stop means connected between the seat part and base part to define the UP-stop and DOWN-stop positions of the seat part, and a height-adjustment device operable, when the seat is under load, to rotate the torsion spring and hence the said suspension arm thereby to raise or lower the static height of the seat part relative to the base part, the height-admustment mechanism being so coupled to the stop means that operation of the height-adjustment device moves the stop means relative to the seat part or base part to maintain the location of the UP- and DOWN-stop positions relative to the adjusted static height of the seat part.

The present invention also provides a vehicle seat comprising a seat part, a spring suspension supporting the seat part and guiding it for upward and downward movement relative to a base part, the suspension comprising a suspension arm pivoted at one end to the seat part and at its opposite end to the base part, a torsion bar having one end connected to the suspension arm for rotational movement with the suspension arm, a radial arm secured to the torsion bar at a position thereon spaced from said one end, a manually-operable weight-adjustment screw device pivoted to and extending transversely from the other end of said radial arm and operable to rotate the radial arm to vary the preload in the torsion bar, a height-adjustment mechanism comprising a height-adjustment member movably mounted on said seat part and supporting the weight-adjustment screw device, and a manually-operable height-adjustment screw device operable to move the height-adjustment member in a sense to rotate the radial arm of the torsion bar and hence, when the seat is under load, to raise or lower the seat part, the seat further comprising a piston/cylinder type vibration damper connected between the seat part and the base part and forming UP and DOWN stop means, the limiting positions of the piston within the cylinder serving to determine the UP and DOWN stop positions of the seat, one part of the vibration damper being coupled to the height-adjustment member for movement thereby relative to the seat part during seat height-adjustment to maintain the UP and DOWN stop positions constant relative to the static height of the seat part.

Figure 1:
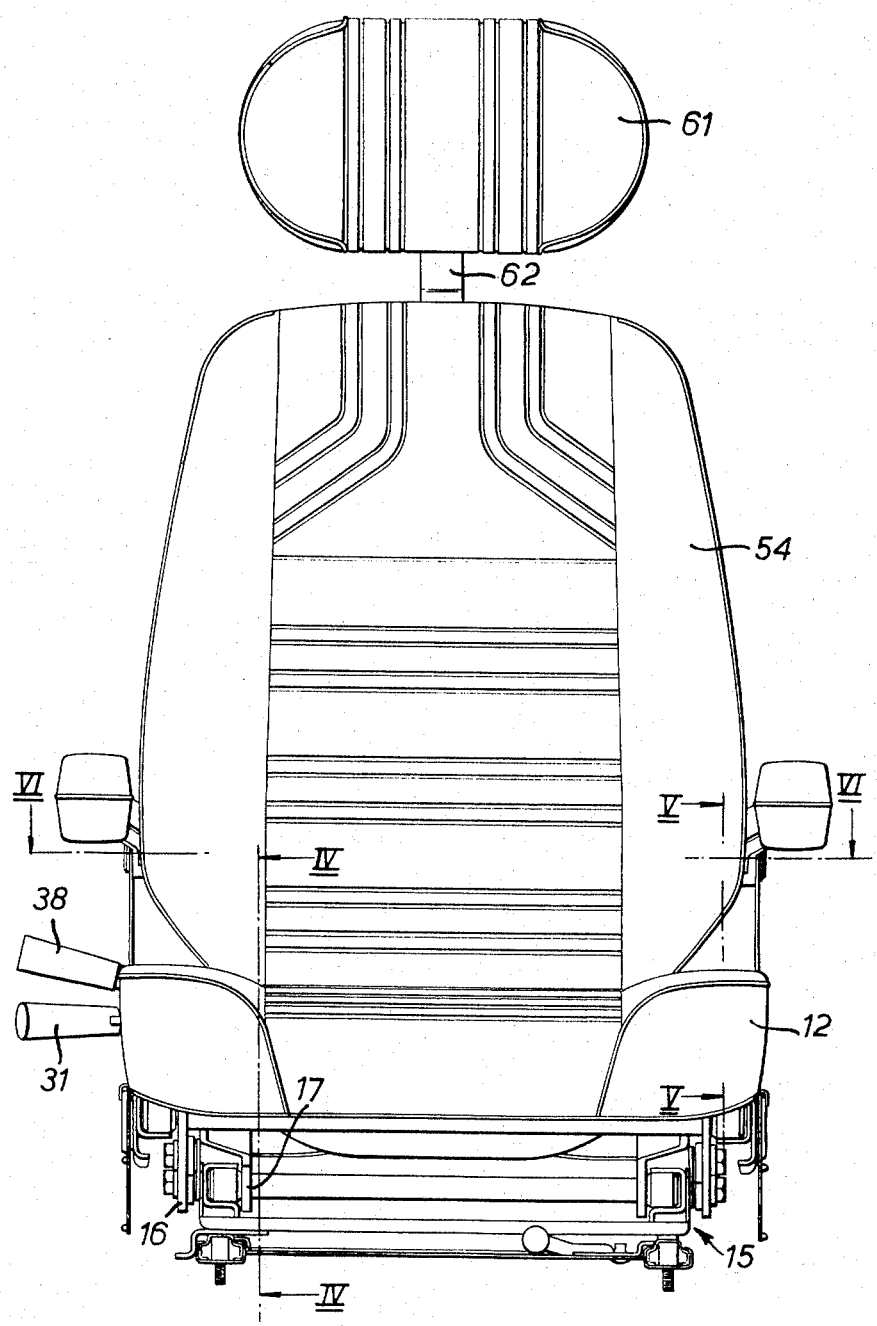
FIG. 1 is a front view of a seat according to the invention.
Figure 2:
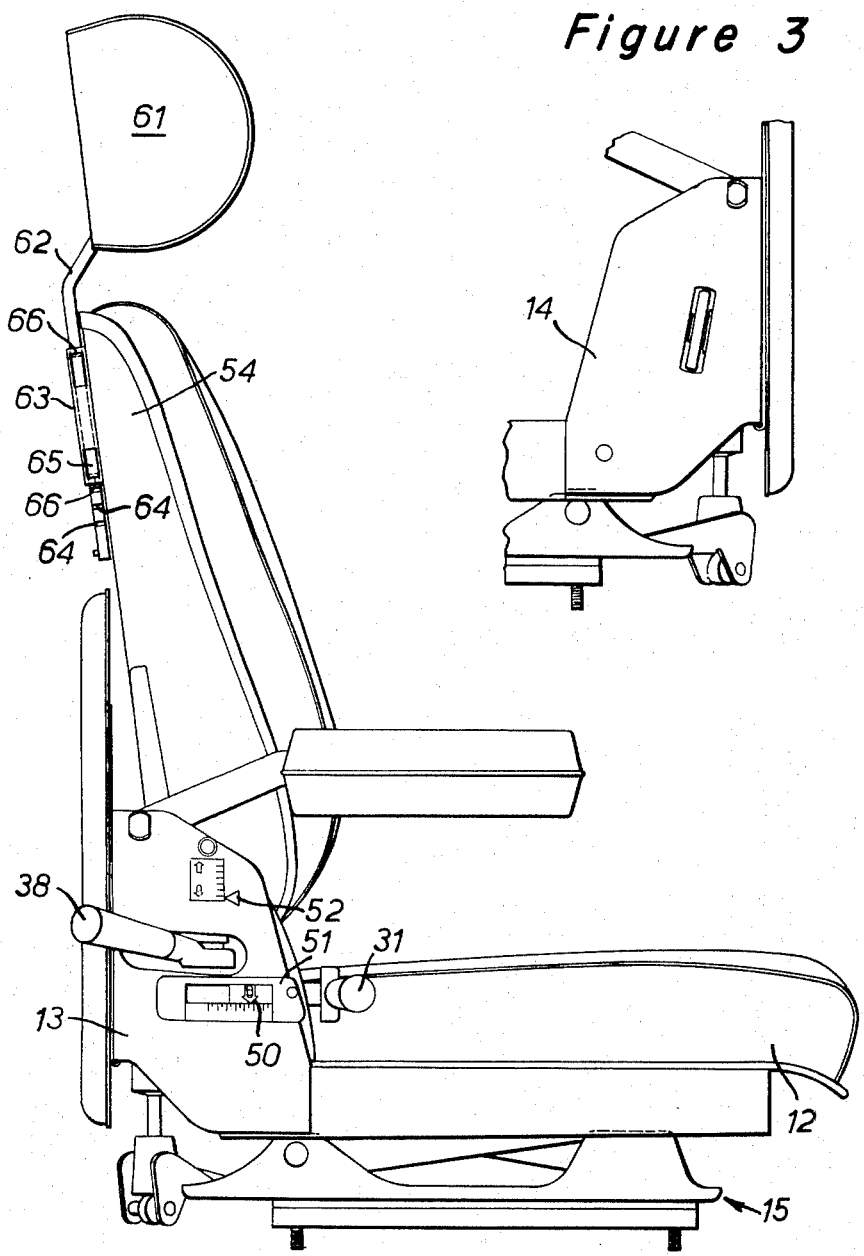
FIG. 2 is a side view of the seat of FIG. 1.
Figure 3:
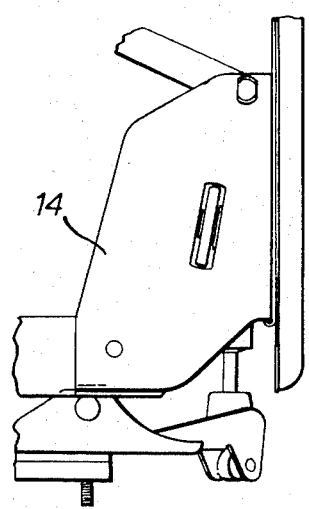
FIG. 3 is a partial view of the opposite side of the seat of FIG. 1.
Figure 4:
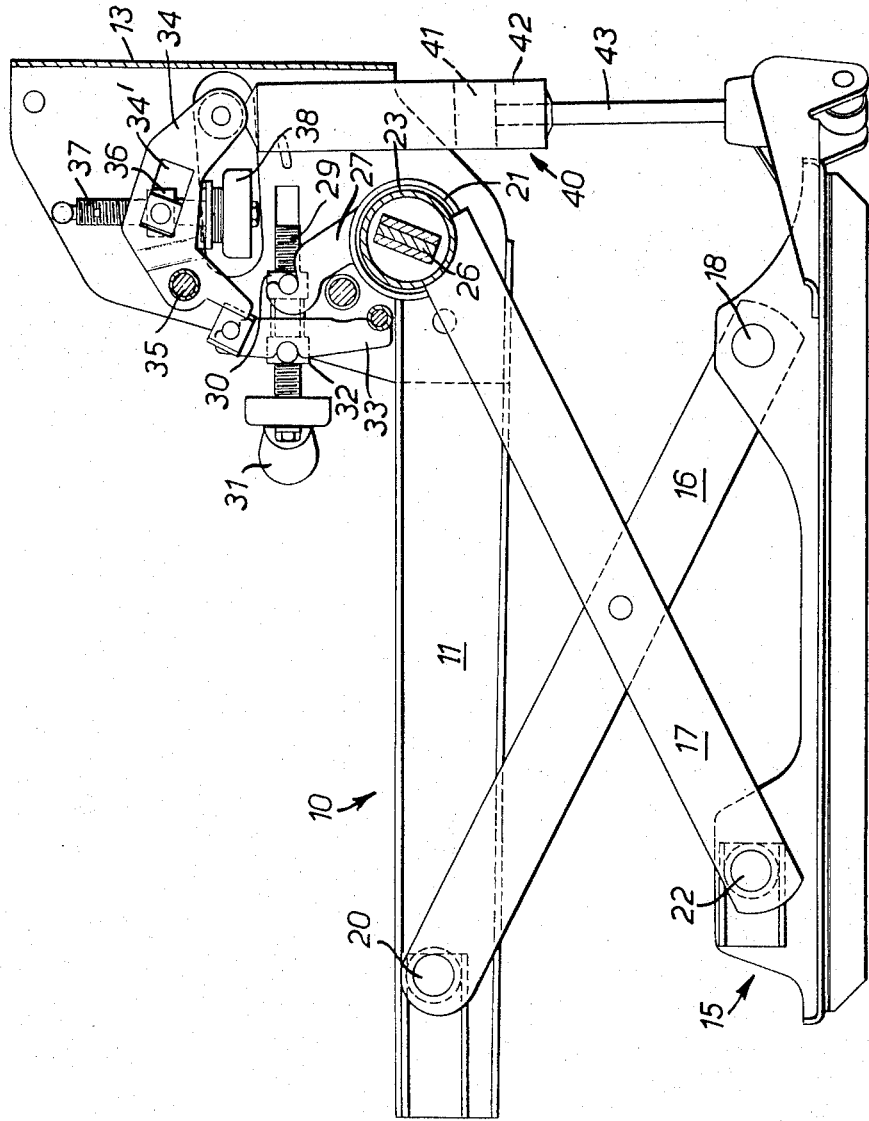
FIGS. 4, 5 and 6 are sections on the lines IV—IV, V—V and VI—VI of FIG. 1.
Figure 5:
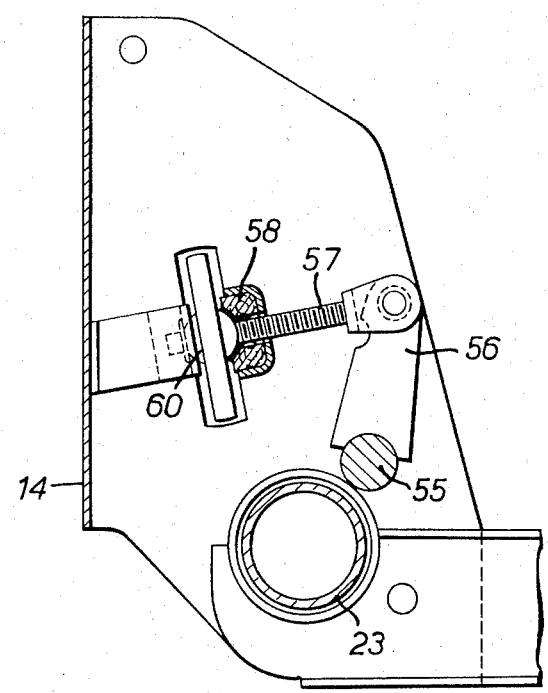
Figure 7:
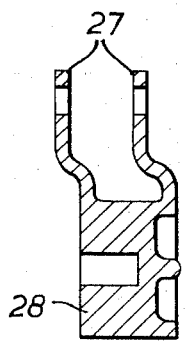
FIGS. 7 and 8 are sections through parts shown in FIG. 4, in planes perpendicular to that of FIG. 4.
Figure 8:
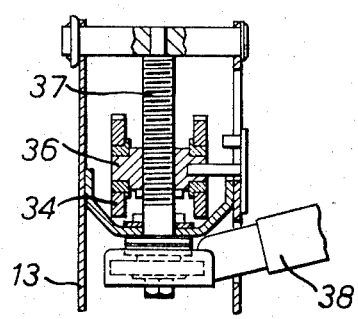
Figure 6:
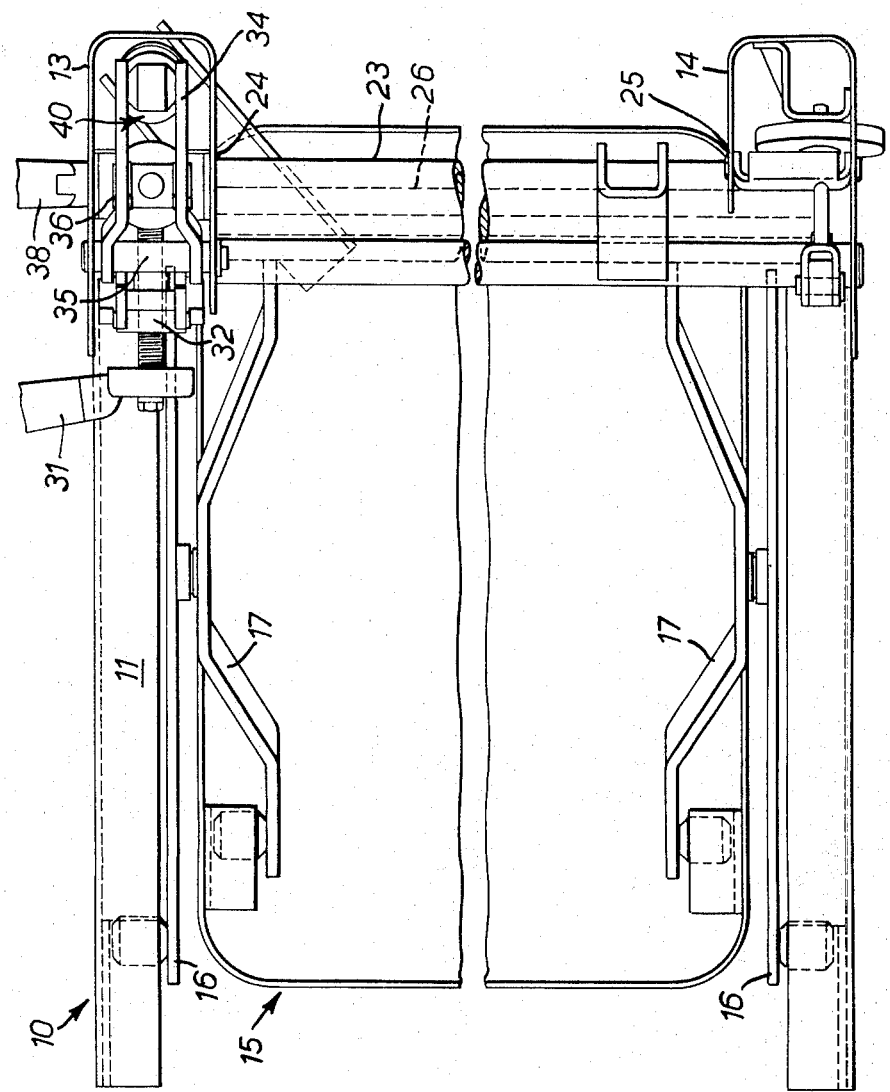

The basic elements of the suspension seat comprise a seat part which is mounted above a base part through a crossed arm linkage which guides the seat part for substantially vertical movement relative to the base part, and a spring in the form of a torsion bar which biasses the seat part upwardly to balance the load of the seat part and its occupant. The preload in the torsion spring should be so adjusted that when the load of the occupant is applied to the seat, it takes up a position (called the ride position), which is mid-way between UP-stop and DOWN-stop positions. A weight-adjustment device is provided which can be manually operated to adjust the preload in the torsion spring to match the weight of the seat occupant. If however the seat occupant wishes to raise or lower his ride position, it is then necessary either to raise or lower the entire seat part. To enable this to be done by the seat occupant without getting out of the seat, a height adjustment device is provided which serves to displace the torsion bar system relative to the part of the seat on which it acts. Since however this will displace the seat part relative to the base part, it is necessary also to adjust the UP and DOWN-stop positions to maintain the static load position of the seat at the ride position i.e mid-way between the UP-stop and DOWN-stop positions. The present seat construction is particularly directed to a mechanism for effecting movement of the UP-stop and DOWN-stop positions simultaneously with height adjustment of the seat part relative to the base part.

Considering the seat construction now in further detail, the seat part 10 comprises a horizontal frame 11 on which a seat pan or seat cushion 12 can be supported, the seat frame having side members which at their rearward ends carry U-section brackets 13, 14 providing pivot mountings for a back support.

The suspension, which is mounted on a base part 15, comprises two pairs of crossed arms 16, 17 disposed at opposite sides of the seat and pivotally interconnected like scissors, each crossed pair comprising one arm 16 which is connected to a fixed pivot 18 mounted at the rear of the base part and extends forwardly and upwardly to a horizontally movable pivot bearing 20 at the front of the seat part formed by a roller movable in a horizontal guide, and the other arm 17 having a fixed pivot 21 mounted at the rearward end of the seat part and extending forwardly and downwardly to a movable pivot 22 at the front of the base part formed, as with the other arm, by a roller moving in a horizontal guide. The two arms 17, which are disposed on the inside of the arms 16, are preferably interconnected rigidly to form a single suspension arm. In particular the arms 17 are formed by the opposite sides of a trough-shaped suspension arm.

The fixed pivot mountings for the crossed arm linkage at the rearward end of the seat part are formed by welding the upper rearward ends of the arms 17 to a tube 23 extending transversely of the seat and which is journalled in bearings 24, 25 in the brackets 13, 14 of the seat part.

The torsion spring, of which the tube forms a part, further comprises a laminated rectangular-section torsion bar 26 which is secured at one end to a support formed by, or fixed to, one end of the tube and is fitted at its opposite end into a solid cylindrical member 28 which is journalled for rotation on the axis of the bar 26, there being a radial arm 27 integral with the cylindrical member. A weight-adjustment mechanism, for adjusting the preload in the torsion bar by rotation of the radial arm comprises a screw 29 which carries a nut 30 having oppositely-extending trunnions engaging in a fork of the radial arm 27. The screw has a ratchet handle 31 at one end and is supported by a thrust bearing 32 so that rotation of the hendle causes the nut to move along the screw and thereby effect rotation of the radial arm. The thrust bearing 32 is formed by a nut which engages a thread on screw 29 (the thread being directed oppositely to the thread which nut 30 engages) the thrust bearing 32 having oppositely-extending trunnions which are carried by the forked outer end of a member 33 pivoted between the parallel spaced walls of the U-section bracket 13. The nut 30 and bearing 32 are separated by a cylindrical spacer. It will be evident that movement of the pivoted member 33 about its pivot will rotate the radial arm 27 of the torsion spring and hence, with constant load on the seat, will roatate the tube 23 of the torsion spring by an equal amount to move the crossed arms 16, 17 of the suspension in a sense to vary the height of the seat part relative to the base part.

A height-adjustment mechanism for effecting pivotal movement of the height-adjustment member 33 comprises a height-adjustment crank lever 34 pivoted to the bracket 13, the lever on one side of its pivot 35 being slidably coupled to the outer end of the pivoted member 33 and, on the other side of its pivot, containing a slot 34' for receiving the trunnions of a nut 36 which rides on a manually-rotatable vertically-mounted height-adjustment screw 37, the outer end of which carries a ratchet handle 38. Thus rotation of the height-adjustment screw will effect pivotal movement of the member 33 and the weight-adjustment mechanism, and hence of the entire torsion bar assembly and suspension arm, to raise or lower the seat part.

The vertical movement of the seat part relative to the base part is also controlled by a vibration damper 40 in the form of a piston 41 movable in a cylinder 42, the outer end of the piston rod 43, in the illustrated embodiment, being secured to the base part and the cylinder itself being secured to the seat part. Clearly however the connections of the vibration damper can be inverted. The movement of the piston within the cylinder is damped by a suitable fluid and the UP and DOWN-stops of the seat part are defined by the limits of movement of the piston within the cylinder. It is normal in addition to provide a rubber buffer to mechanically form a bump or DOWN-stop between the seat part and the base part.

In order therefore to move the UP- and DOWN-stops in accordance with any upward and downward movement of the seat part resulting from adjustment of the height-adjustment mechanism, the cylinder of the vibration damper is carried pivotally by the outer end of the height-adjustment lever 34. Moreover the distance between the pivot 35 of the height-adjustment lever 34 and the pivot axis between the cylinder 42 and the lever 34 is such that the cylinder of the vibration damper is raised or lowered relative to the seat part, thereby to lower or raise the UP-and DOWN-stop positions, by an amount equal to the distance moved by the seat part due to operation of the height-adjustment mechanism, but in the opposite direction.

In order to enable the user of the seat to set the weight adjustment mechanism before he occupies the seat, a weight indicator is provided in the form of a cooperating pointer 50 and scale 51. The pointer is secured to the nut 30 engaged by the radial arm 27 of the torsion spring and slides in a slot in the scale, the scale being secured to the nut 32 carried by the height adjustment member 33. The scale is graduated in units of weight, and by rotation of the weight adjustment handle 31, the pointer 50 can be set by the user to his appropriate weight on the scale.

It will thus be seen that during weight adjustment, the pointer ánd scale will move relatively to one another, but during height adjustment, the height adjustment member and the radial arm will move in unison with one another and consequently the pointer and scale will also move in unison with one another.

A seat height indicator is also provided in the form of a pointer 52 cooperating with a scale 53, one being secured to the bracket 13 and the other being secured to the nut 36 of the height adjustment mechanism.

Although the construction described above provides a height adjustment mechanism which operates by moving the radial arm of the weight adjustment mechanism at one end of the torsion bar, it will be apparent that the height adjustment mechanism could alternatively be attached to the opposite end of the torsion bar and effect relative movement between said opposite end of the torsion bar and the adjacent end of the torsion spring tube, which are rigidly connected together in the embodiment described above.

Furthermore, although the above embodiment provides a torsion spring and adjustment mechanisms acting between a suspension arm and the seat part, the torsion spring and adjustment mechanisms could act between the suspension arm and the base part.

The seat also has a back support 54 mounted, at its lower end on a shaft 55 journalled in the brackets 13, 14 at opposite sides of the seat, one end of the shaft having a radial arm or crank 56 whose outer end pivotally carries one end of a coupling arm 57 disposed approximately normal to, and coplanar with, the radial arm. The outer end of the coupling arm, which is screw-threaded, extends through a thrust bearing 58 into engagement with a nut 60. This nut has a large diameter periphery forming a wheel which can be rotated by the seat occupant to vary the inclination of the back support.

A head rest 61 is mounted above the top of the back support on a rectangular-section supporting rod 62 which is slidable in a trough-section member 63 screwed to the back support. One edge of the supporting rod has equidistantly spaced notches 64, and a leaf spring 65 secured to one side of the trough-section member is provided at its ends with inwardly-bent nose-shaped detents 66 which project away from the plane of the leaf spring and extend through openings in the side of the trough member to engage a pair of notches in the support rod. This spring engagement occurs with just sufficient force to hold the head rest at the desired height and prevent the support rod from rattling within the trough member.

What I claim is:

1. A vehicle seat comprising a seat part supported and guided by a suspension for upward and downward movement relative to a base part, the suspension comprising a system of pivotal suspension arms interconnecting the seat part and base part, a torsion spring connected to one of said arms and applying torque thereto in a sense to oppose its downward pivotal movement, a weight-adjustment mechanism acting on the torsion spring and operable to vary the preload in the spring to match the weight of the seat occupant, stop means connected between the seat part and base part to define the UP-stop and DOWN-stop positions of the seat part, and a height-adjustment device operable, when the seat is under load, to rotate the torsion spring and hence the said suspension arm thereby to raise or lower the static height of the seat part relative to the base part, the height-adjustment mechanism being so coupled to the stop means that operation of the height-adjustment device moves the stop means relative to the seat part or base part to maintain the location of the UP- and DOWN-stop positions relative to the adjusted static height of the seat part.

2. A vehicle seat according to claim 1 wherein the weight-adjustment mechanism is connected between the torsion spring and the height-adjustment mechanism.

3. A vehicle seat according to claim 1 wherein the height-adjustment mechanism is mounted on the seat part, the end of the torsion spring remote from the height-adjustment mechanism being secured to the suspension arm.

4. A vehicle seat according to claim 3 wherein the height-adjustment mechanism includes a height-adjustment member pivoted to the seat part, the height-adjustment member and the stop means both being coupled to a manually-operable height-adjustment screw device for simultaneous movement thereby, the weight-adjustment mechanism including a manually-operable weight-adjustment screw device coupled between the height-adjustment member and a radial arm on the torsion spring.

5. A vehicle seat according to claim 4 wherein the weight-adjustment screw device comprises a rotatably-mounted screw having two oppositely-directed threads, one thread engaged by a nut supported by the height-adjustment member and the other thread engaged by a nut on the radial arm.

6. A vehicle seat according to claim 1 wherein the stop means comprise a vibration damper of the type having a piston movable in a cylinder, one part of the vibration damper being connected to the seat part and the other to the base part.

7. A vehicle seat according to claim 2 having a weight-adjustment indicator comprising a pointer member and scale member, one of said members of the indicator being movable with the height-adjustment mechanism and the other with the part of the torsion spring connected to the weight-adjustment mechanism.

8. A vehicle seat according to claim 1 having a back support extending upwardly from a horizontal bar journalled in side members of the seat part, and a manually-operable screw device journalled in a said side member and pivoted to the outer end of a crank on said bar, for varying the inclination of the back support.

9. A vehicle seat according to claim 8 having a head rest secured to a rod which is slidably mounted on the back support, the rod having notches equidistantly spaced apart along one edge thereof, and a leaf spring secured to the back support and having nose portions at opposite ends thereof projecting away from the plane of the leaf spring for engagement with a pair of said notches.

10. A vehicle seat according to claim 2 wherein the suspension is of the scissors-linkage type.

11. A vehicle seat comprising a seat part, a spring suspension supporting the seat part and guiding it for upward and downward movement relative to a base part, the suspension comprising a suspension arm pivoted at one end to the seat part and at its opposite end to the base part, a torsion bar having one end connected to the suspension arm for rotational movement with the suspension arm, a radial arm secured to the torsion bar at a position thereon spaced from said one end, a manually-operable weight-adjustment screw device pivoted to and extending transversely from the other end of said radial arm and operable to rotate the radial arm to vary the preload in the torsion bar, a height-adjustment mechanism comprising a height-adjustment member movably mounted on said seat part and supporting the weight-adjustment screw device, and a manually-operable height-adjustment screw device operable to move the height-adjustment member in a sense to rotate the radial arm of the torsion bar and hence, when the seat is under load, to raise or lower the seat part, the seat further comprising a piston/cylinder type vibration damper connected between the seat part and the base part and forming UP and DOWN stop means, the limiting positions of the piston within the cylinder serving to determine the UP and DOWN stop positions of the seat, one part of the vibration damper being coupled to the height-adjustment member for movement thereby relative to the seat part during seat height-adjustment to maintain the UP and DOWN stop positions constant relative to the static height of the seat part.

* * * * *